United States Patent [19]

Puozzo et al.

[11] Patent Number: 4,899,024
[45] Date of Patent: Feb. 6, 1990

[54] METHOD FOR TREATING LARGE CAST IRON DIES, PARTICULARLY FOR VEHICLE-SHEET METAL PRESSING

[75] Inventors: Luciano Puozzo; Maurizio Manzin, both of Turin, Italy

[73] Assignee: 501 Fiat Auto S.P.A., Turin, Italy

[21] Appl. No.: 135,306

[22] Filed: Dec. 21, 1987

[30] Foreign Application Priority Data

Dec. 19, 1986 [IT] Italy ............................... 67946 A/86

[51] Int. Cl.⁴ .............................................. H05B 6/64
[52] U.S. Cl. .............................. 219/10.41; 219/10.43; 219/10.57; 219/10.61 R; 219/10.75; 148/141
[58] Field of Search ............... 219/10.41, 10.43, 8.5, 219/121.85, 10.491, 10.57, 10.59, 10.61 R, 10.67, 10.75, 10.79, 10.81; 148/141, 145, 146, 147, 150, 154, 156, 27

[56] References Cited

U.S. PATENT DOCUMENTS 4,599,502 7/1986 Khare ..................................... 219/8.5
4,652,724 3/1987 Morita ............................ 219/121.85

FOREIGN PATENT DOCUMENTS 57-186044 11/1982 Japan .
717620 10/1954 United Kingdom .
840612 7/1960 United Kingdom .

Primary Examiner—Teresa J. Walberg
Assistant Examiner—Leon K. Fuller
Attorney, Agent, or Firm—Shlesinger & Myers

[57] ABSTRACT

A method for preparing large cast iron dies for use in pressing the sheet-metal components of vehicle bodies is described; this method results in improved pressing performance, such as extended life and, in particular, drastic reduction in rejects and stoppages due to seizure; its main characteristic consists of subjecting to induction hardening treatment those die regions most subject to operational wear.

4 Claims, 1 Drawing Sheet

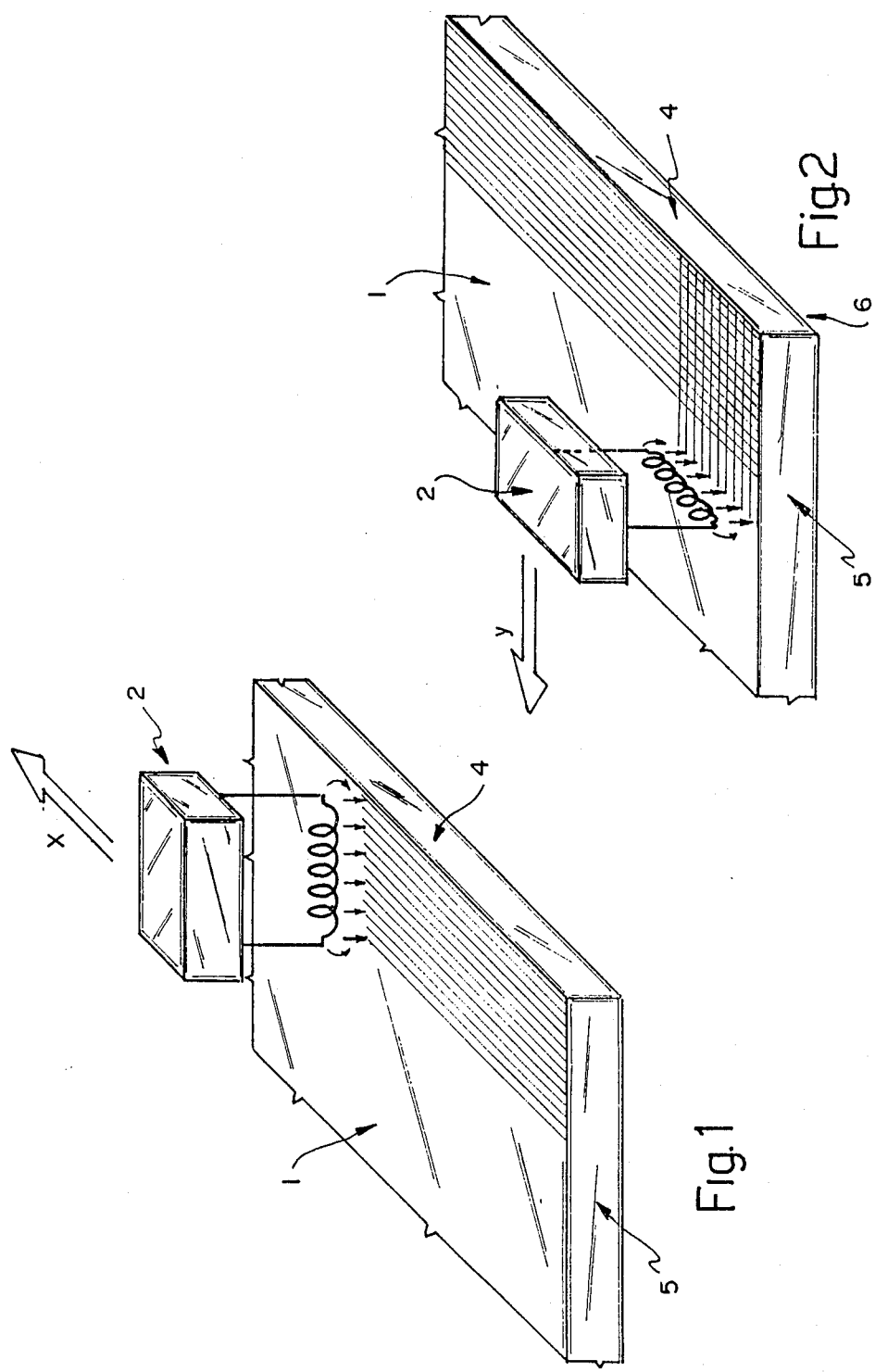

METHOD FOR TREATING LARGE CAST IRON DIES, PARTICULARLY FOR VEHICLE-SHEET METAL PRESSING

BACKGROUND OF THE INVENTION

This invention relates to a method for preparing large cast iron dies, particularly of the type used in the automobile industry for pressing sheet metal to form vehicle body parts. Such dies are usually constructed at the present time of alloy cast iron, which after casting is mechanically machined, this being followed in most cases by surface hardening of those regions of the die which are subjected to maximum wear when in use. This is usually done by surface flame hardening. Specifically, the purpose of the surface hardening is to harden these die regions in order to increase their wear resistance, which is known to depend on the surface hardness, so increasing the life of the entire die and obviating the need to take costly action to restore its initial geometry, with consequent production loss. However, flame hardening has numerous drawbacks: it is of slow implementation and cannot be automated due to the fact that because of its nature it cannot be easily parameterized, and therefore has to be executed manually by specialised operators; moreover, whatever the ability of these latter it does not produce uniform results in terms of hardness and depth of hardening, and can give rise to cracks in the die with consequent need for repair; on the other hand, the replacement of flame hardening by other analogous surface hardening treatments such as induction, has not so far been possible, as the complicated shapes of the dies inevitably result in superimposing of more than one hardening treatment in certain regions of the die, with the consequent formation of cracks. Finally, known flame-hardened dies have the drawback of being subject to seizure when in use, this being the cause of many pressing rejects and the need for considerable lubrication, and in addition results in frequent and costly down-times of the presses equipped with such dies.

SUMMARY OF THE INVENTION

An object of the invention is to provide a method for preparing large cast iron dies, in particular those used for vehicle sheet-metal pressing, which obviates the need for flame-hardening while ensuring an acceptable die life; a further object is to provide dies which when in use are able to reduce lubricant consumption and/or reduce or eliminate rejects and machine stoppages due to seizure.

Said objects are attained according to the invention by a method for preparing large cast iron dies, particularly for sheet-metal pressing for vehicle construction, characterised in that in those die regions which are most subject to wear in relation to the specific use of the die, this latter is subjected to localised induction hardening treatment such as to produce a localised martensitic transformation to a depth of between 1 and 3 mm and a surface hardness exceeding 400 HB; said treatment being executed, in correspondence with die portions defined by the superimposing of adjacent regions to be both subjected to hardening, by two successive hardening operations along directions which cross at 90° to each other.

BRIEF DESCRIPTION OF THE DRAWINGS

FIG. 1 shows schematically a first induction hardening step on a generic surface; and
FIG. 2 shows schematically a second induction hardening step carried out on the same surface, according to the process of the present invention.

DETAILED DESCRIPTION OF THE INVENTION

In practice, the applicant has surprisingly found that by operating in a suitable manner it is possible to apply known induction hardening treatment to cast iron dies for automobile use in place of the costly, slow and unsatisfactory flame-hardening, without the occurrence, which common opinion has up to the present time considered inevitable, of cracks in those die regions in which more than one successive hardening treatment has been superimposed because of the die geometry. By virtue of this advantageous method of operation, which consists substantially of moving the inductor electrode, by which the treatment is carried out, in such a manner as to superimpose two successive hardening operations by executing them only along directions which cross at 90° to each other and with about 1 mm of superimposing, a uniform and considerable increase in the surface hardness of the die is obtained with the absence of cracks precisely in those regions subject to most wear, and consequently a greater die life is obtained together with a lower cost and increased speed of treatment. Moreover, as induction hardening is an operation which can be parameterized and requires only simple movements, it is possible to automate the hardening operation, by carrying it out for example by robots. However the most surprising result of the method of operation according to the invention, and which was completely unexpected and unforseeable, consists of the fact that those cast iron dies which have undergone induction hardening treatment in those regions in which wear is mostly localised during use, have shown an operational behaviour which is decidedly superior and suprising, with the almost total disappearance of seizure during the sheet-metal working and a considerable reduction in deep-drawn rejects, which drastically reduce machine stoppages during use. This unexpected behaviour of dies constructed in accordance with the method of the invention is usually also accompanied by a drastic reduction in the need for die lubrication during the sheet-metal pressing, and this is even more apparent if during the die construction, particular methods of executing the induction hardening are combined with particular types of cast iron.

In particular, the Applicant has experimented successfully with two types of cast iron, namely pearlitic Meehanite cast iron such as GM400 (UNI standard), of a nominal weight composition of 3% C, 1.10–1.40% Si and 0.9–1.10% Mn, and vanadium-chromium-molybdenum alloy cast irons of lamellar structure such as G240 (UNI standard), of nominal weight composition 2.8–3.5% C, 1.5–2.2% Si, 0.15% V, 0.75% Mo and 0.35–0.5% Cr. Conventional cast irons for die construction were also successfully used, such as nickel-chromium alloy cast irons, for example G210 (UNI standard). With reference to FIG. 1, induction hardening of the appropriate regions of the dies constructed of these cast irons (schematically represented in FIGS. 1 and 2, for the sake of simplicity, as a plate, designated by reference numeral 1) is effected by copper inductor electrodes 2 internally cooled by water circulation, and made to move at constant speed (of the order of 0.3–0.5 m/min) along rectilinear or curved trajectories in a single predetermined direction (indicated by the arrows X and Y) along each trajectory. The inductors, preferably shaped in accordance with the profile of the regions to be hardened, but which can also be flat, are disposed at a distance from the region to be hardened of between 2 and 4 mm and are fed with an electric power of between 40 and 50 kW, operating with alternating current at a frequency of about 4000 Hz. Of the dies according to the invention, which are of conventional construction by casting followed by mechanical machining, those parts which are most suitable for induction hardening treatment, and at the same time giving the best overall results in terms of greater overall die efficiency, are the blank holder rings, which are usually those components which are most critical to the effects of wear. After heating to beyond the austenization temperature by the inductor electrode, quenching is effected according to the invention by two methods, namely with water by means of a cold water jet which follows the inductor at a predetermined distance, or in air by free cooling to ambient temperature after heating. Air quenching has proved effective for all the tested cast irons, but leads to hardness values which are not particularly high. In contrast, for the purposes of obtaining best results (greatest hardness and hardening depth), water quenching has proved particularly suitable only in combination with the use of Meehanite cast irons. Finally, in order to obtain the described surprising results in accordance with the invention, it has been found absolutely necessary to conduct the induction hardening treatment in such a manner as to obtain in the treated regions a localised martensitic transformation to a depth of between 1 and 3 mm and a surface hardness exceeding 400 HB (Brinell number). These parameters are critical, and on the basis of these any expert of the art is able to calculate, using the known mathematical and empirical correlations, those electrical parameters which need to be set on any type of known induction machine.

According to the methods of the present invention, two adjacent edges 4 and 5 of plate 1 can be hardened by a first hardening operation carried out by moving an inductor 2 along a first direction parallel to edge 4, shown by arrow X (FIG. 1), and by a second hardening operation carried out by moving inductor 2 along edge 5 in a second direction, shown by arrow Y (FIG. 2), which is substantially perpendicular to the first one. In this manner, corner 6 lying between edges 4 and 5, that should be subjected in any case to two superimposed hardening operations, is subjected to two successive hardening operations along directions which intersect at 90° to each other, as shown by thin lines, thereby avoiding any risk of damaging such zone.

The present invention is further described by way of non-limiting illustration hereinafter with reference to the following practical examples.

EXAMPLE 1

Using cast irons of different compositions, all of which fall within those listed in Table I, 4 test-pieces of 210 cast iron, 4 test-pieces of Meehanite cast iron, 8 test-pieces of nodular cast iron and 8 test-pieces of Cr-V-Mo lamellar cast iron are prepared. All the test-pieces are rectilinear, having dimensions of 40×100×100 mm, and a sectional shape identical to that of the blank holder rings of dies used in the automobile industry, and are induction hardened using unprofiled flat electrodes, with cooling both in air and by means of a water jet, and treating different adjacent surfaces of the test-pieces so as to produce superimposed treatment on certian portions of the test-pieces. This superimposing is produced both randomly and by taking care to superimpose two successive treatments at 90° to each other by moving the electrode firstly in one direction and then, at least in the superimposing region, in only one other direction orthogonal to the first. The parameters used are: frequency 4000 Hz, power 48 kW, test-piece/electrode distance 3 mm. The results obtained are given in Table II.

TABLE I

| Type of cast iron | Chemical composition | | | | | | | | |
|---|---|---|---|---|---|---|---|---|---|
| | C | Si | Mn | Ni | Cr | V | Mo | Cu | Mg |
| 60.38.02 nodular | 3.4 | 2.2 | 0.7 | 0.5 | — | — | | 0.6 | 0.03 |
| | 3.6 | 2.5 | | 1 | | | | | |
| V.Cr.Mo lamellar | 2.8 | 1.5 | 0.6 | — | 0.35 | | 0.75 | — | — |
| | 3.5 | 2.2 | 0.9 | | 0.5 | 0.15 | | | |
| GM | 3 | 1.1 | 0.9 | — | — | — | — | — | — |
| Meehanite | | 1.4 | 1.1 | | | | | | |
| G210 | 2.6 | 1.25 | 0.6 | 2.25 | 0.75 | — | — | — | — |
| | 3.5 | 2.25 | 1 | 2.50 | 1 | | | | |

TABLE II

| Test-piece No. | cast iron | water quench | air quench | super-imposed | cracks | thickn. mm | hardn. (HB) |
|---|---|---|---|---|---|---|---|
| 1 | GM | yes | | no | no | 3 | 560 |
| 2 | " | yes | | yes | " | 2.9 | 550 |
| 3 | " | | yes | no | " | 2 | 460 |
| 4 | " | | yes | yes | " | 1.8 | 430 |
| 5 | 210 | yes | | no | " | 2.8 | 580 |
| 6 | " | yes | | yes 90° | " | 2.7 | 540 |
| 7 | " | | yes | yes | " | 1.7 | 420 |
| 8 | " | | yes | yes | " | 1.6 | 410 |
| 9 | GS | yes | | no | yes | 2.6 | 440 |
| 10 | " | yes | | no | yes | 2.7 | 450 |
| 11 | " | yes | | yes | yes | 3 | 430 |
| 12 | " | yes | | yes 90° | yes | 2.8 | 435 |
| 13 | " | | yes | no | no | 1.9 | 430 |
| 14 | " | | yes | no | no | 2 | 435 |
| 15 | " | | yes | yes | yes | 1.8 | 420 |
| 16 | " | | yes | yes 90° | no | 1.9 | 430 |
| 17 | V.Cr.Mo | yes | | no | yes | 3 | 480 |
| 18 | " | yes | | no | yes | 2.9 | 470 |
| 19 | " | yes | | yes | yes | 3 | 475 |
| 20 | " | yes | | yes 90° | yes | 2.8 | 480 |
| 21 | " | | yes | no | no | 1.8 | 440 |

TABLE II-continued

| Test-piece No. | cast iron | water quench | air quench | super- imposed | cracks | thickn. mm | hardn. (HB) |
| --- | --- | --- | --- | --- | --- | --- | --- |
| 22 | " | | yes | no | no | 2 | 435 |
| 23 | " | | yes | yes | yes | 1.8 | 430 |
| 24 | " | | yes | yes 90° | no | 1.9 | 440 |

EXAMPLE II

Operating as in Example I but using a profiled electrode, standard dies are prepared for producing the rear wheelhouse of an automobile, its blank holder rings being constructed of Cr-V-Mo cast irons having the composition indicated in Table I and quenched with water. These dies are then used for sheet-metal pressing together with other similar dies of conventional construction, ie having manually flame-hardened blank holder rings of G210 cast iron construction. The operating results are given in Table III.

TABLE III

| Type of cast iron | No. of pieces produced | % to be scrapped | % to be repaired | Stoppages due to seizure |
| --- | --- | --- | --- | --- |
| 210 flame-hardened | 77,300 | 0.32 | 1.35 | 50 |
| Cr.V.Mo induction-hardened | 117,150 | 0.01 | 0.55 | 1 |

EXAMPLE III

Operating as in Example II, standard dies are prepared for producing an automobile side member, its blank holder rings being constructed of GM400 Meehanite cast irons having the composition indicated in Table I, and quenched with water. These dies are then used for sheet-metal pressing together with other similar dies of conventional construction, ie having manually flame-hardened blank holder rings of G210 cast iron construction. The operating results are given in Table IV.

TABLE IV

| Type of cast iron | No. of pieces produced | % to be scrapped | % to be repaired | Stoppages due to seizure |
| --- | --- | --- | --- | --- |
| 210 flame-hardened | 315,000 | 0.95 | 1.30 | 40 |
| Meehanite induction-hardened | 36,000 | 0.29 | 0.6 | 0 |

EXAMPLE IV

Operating as in Example II, standard dies are prepared for producing the lower body side of an automobile, its blank holder rings being constructed of G210 NiCr alloy cast iron having a composition as indicated in Table I and quenched with water. These dies are then used for sheet-metal pressing together with other similar dies of conventional construction, ie having manually flame-hardened blank holder rings of G210 cast iron construction. The operating results are given in Table V.

TABLE V

| Type of cast iron | No. of pieces produced | % to be scrapped | % to be repaired | Stoppages due to seizure |
| --- | --- | --- | --- | --- |
| 210 flame-hardened | 2,200 | 3.65 | 2.89 | 9 |
| 210 induction-hardened | 10,600 | 1.61 | 1.26 | 6 |

We claim:

1. A method for localized induction hardening of adjacent regions of a cast iron piece, in particular the piece forming at least a part of a die for pressing metal sheets, to produce, in each said region, a localized martensitic transformation, said adjacent regions having a portion in common, wherein the hardening of said common portion is obtained by two successive hardening operations performed along directions at substantially right angles to each other and in such a manner as to obtain in said adjacent regions a depth of the martensitic transformation of 1 to 3 mm and a surface hardness exceeding 400 HB.

2. A method as claimed in claim 1, wherein said cast iron is chosen from a group consisting of pearlitic Meehanite cast irons, vanadium-chromium-molybdenum alloy cast irons of lamellar structure, and Ni-Cr allow cast irons.

3. A method as claimed in claim 1, wherein said common portion has a width not exceeding 1 mm.

4. A method as claimed in claim 1, wherein each said hardening operation is carried out by arranging any known copper inductor electrode of the type internally water cooled at a distance of between 2 and 4 mm from each said region, and by moving the electrode along said region at a constant speed in a single predetermined direction, while applying to the electrode a power of 40 to 50 kw, with a current alternating at a frequency of about 4,000 Hz.

* * * * *